Sept. 3, 1968     A. D. BAKER ET AL     3,400,307

FULL WAVE RECTIFIERS FOR THREE PHASE SUPPLY

Filed Dec. 21, 1965

United States Patent Office 3,400,307
Patented Sept. 3, 1968

3,400,307
FULL WAVE RECTIFIERS FOR THREE
PHASE SUPPLY
Alfred Dickens Baker, Solihull, and Frank Grenville
Hudman, Coldfield, England, assignors to Joseph Lucas
Industries Limited, Birmingham, England, a British
company
Filed Dec. 21, 1965, Ser. No. 515,407
Claims priority, application Great Britain, Dec. 23, 1964,
52,216/64
1 Claim. (Cl. 317—233)

ABSTRACT OF THE DISCLOSURE

This invention relates to a full wave rectifier having a three-phase supply. The rectifier has seven electrically conductive plates with a rectifier diode stacked between each two adjacent plates. The anode and cathode terminal of each rectifier is connected respectively to one of the two plates adjacent on its opposite sides. Two of the plates are connected to the anode of three of the diodes in a common terminal. Two other plates are connected to the cathode of three other diodes in a common terminal. The remaining plates comprise means for connecting one phase of the three-phase supply respectively thereto.

---

This invention relates to a full wave rectifier for use with a three-phase supply.

A rectifier according to the invention comprises seven electrically conductive plates which are separated by diode assemblies, four of the plates being connected in pairs respectively to a pair of output terminals and the arrangement being such that when in use the other three plates are connected to the phases of the supply, a rectifier supply will appear between the pair of terminals.

In the accompanying drawings.

Figure 1:
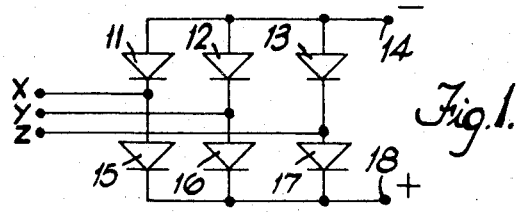
FIGURE 1 illustrates the circuit diagram of a three-phase full wave rectifier.
Figure 2:
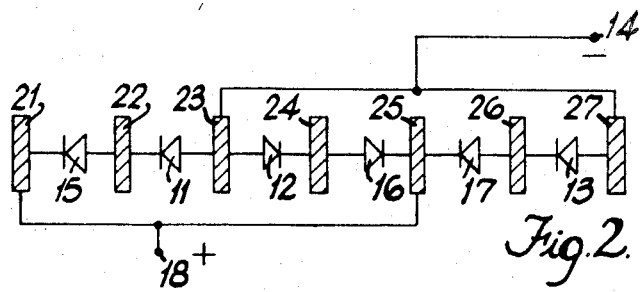
FIGURE 2 illustrates diagrammatically the arrangement of diode assemblies and plates.

Referring to FIGURE 1, the circuit includes three diodes 11, 12, 13 having their cathodes connected to the phases x, y, z of the supply respectively and their anodes connected to a negative output terminal 14, and three further diodes 15, 16, 17 having their anodes connected to the phases x, y, z respectively and their cathodes connected to a positive output terminal 18. Each diode takes the form of an assembly supporting the actual rectifying junction, the assemblies serving to space apart seven electrically conductive plates 21, 22, 23, 24, 25, 26, 27 shown in FIGURE 2. The assemblies are arranged so that the diodes 11, 12 have their anodes connected to the plate 23 and their cathodes connected to the plates 22, 24 respectively, the diode 13 has its anode and cathode connected to the plates 27, 26 respectively, the diode 15 has its anode and cathode connected to the plates 22, 21 respectively and the diodes 16, 17 have their cathodes connected to the plate 25 and their anodes connected to the plates 24, 26 respectively. The plates 23, 27 are connected to the terminal 14, the plates 21, 25 are connected to the terminal 18 and the plates 22, 24, 26 are connected respectively to the phases x, y, z of the supply.

Figure 3:
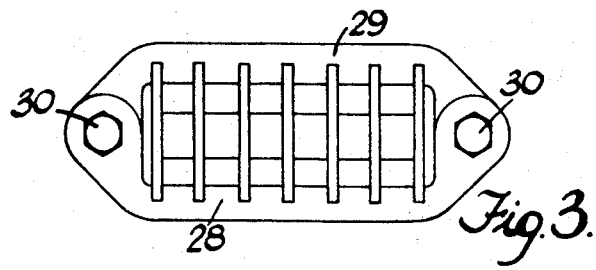
FIGURE 3 is a side view of the supporting structure for the diode assemblies and plates, and, FIGURE 4 is a sectional side view of the preferred diode assembly.

As shown in FIGURE 3, the plates and diode assemblies are held in position by a pair of U-shaped arms 28, 29 held together by bolts 30 passing through their ends, intermediate portions of the arms being formed with seven grooves into which the plates project. Conveniently the plates are shaped to receive connectors.

Figure 4:
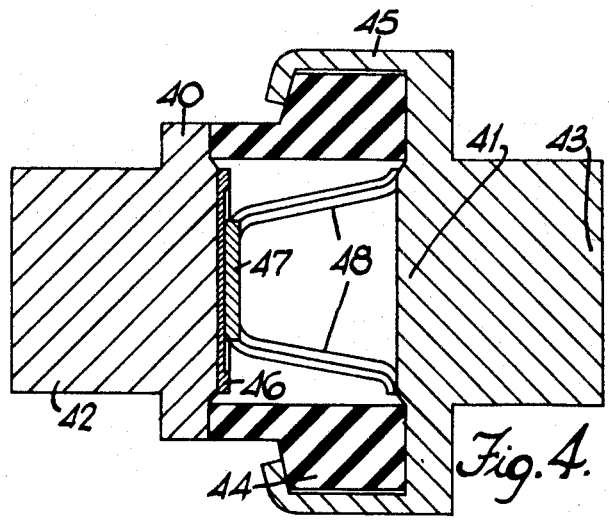

The diode assemblies could consist entirely of semi-conductor discs without any mechanical support, but it is preferred to use diode assemblies as shown in FIGURE 4.

Referring to FIGURE 4, the assembly includes a pair of discs 40, 41 formed from metal and held in spaced relationship to each other by a body part 44 formed from electrically insulating material. The discs 40, 41 are provided with integral and outwardly extending projections 42, 43 respectively and the body part is hollow. Each disc is secured to the body part by a pair of diametrically disposed hook-shaped arms 45, which, during manufacture of the assembly, are turned over to bear against inclined surfaces on the body part, and the pairs of arms on the discs are disposed at 90° relative to each other so as to avoid the risk of direct electrical contact between the discs.

Within the hollow body part is located a rectifier element 46 formed from semi-conductor material and having opposite conductivity regions formed therein. Conveniently the element is secured, as by soldering, to a machined face on the disc 40 and this serves to provide an electrical connection to one conductivity region of the element. The other region of the element is electrically connected to the disc 41 by a metal bridge piece which comprises a base portion 47 from which extend integral and resilient legs 48 the free ends of which bear against the disc 41. In use, besides ensuring the electrical connection to the disc 41 the legs also accommodate expansion which occurs owing to the heating of the element. Conveniently the base portion 47 of the bridge piece is soldered to the element 46.

As explained, in order to facilitate identification of the polarity of the discs 40, 41 the projections 42, 43 are of different cross-sectional shape and in the particular example the projection 42 is of circular section whilst the projection 43 is of square section. Furthermore, the body part 44 is formed from alumina or alternatively beryllium oxide so as to have high thermal conductivity.

Having thus described our invention what we claim as new and desire to secure as Letters Patent is:

1. A full wave rectifier for three-phase supply comprising seven electrically conductive plates and a rectifier diode stacked between each two adjacent plates, with the anode and cathode terminal of each rectifier connected respectively to one of the two plates adjacent on its opposite sides, two of said plates connected to the anode of three of the diodes in a common terminal, two other of said plates connected to the cathode of three other of the diodes in a common terminal, and each of the other remaining plates comprising means for connecting one phase of the three-phase supply respectively thereto.

References Cited

UNITED STATES PATENTS

| 2,117,020 | 5/1938 | Conrad | 317—234 |
| 2,345,499 | 3/1944 | Peter et al. | 317—234 |

JAMES D. KALLAM, *Primary Examiner.*